(12) United States Patent
Huang (10) Patent No.: US 11,490,391 B2
(45) Date of Patent: Nov. 1, 2022

(54) CONFIGURING MULTIPLE TRANSMISSIONS

(71) Applicant: ZTE Corporation, Guangdong (CN)

(72) Inventor: Chen Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 57 days.

(21) Appl. No.: 16/935,749

(22) Filed: Jul. 22, 2020

(65) Prior Publication Data

US 2020/0351895 A1  Nov. 5, 2020

Related U.S. Application Data

(63) Continuation of application No. PCT/CN2018/073611, filed on Jan. 22, 2018.

(51) Int. Cl.
*H04W 72/04* (2009.01)
*H04L 1/00* (2006.01)
(Continued)

(52) U.S. Cl.
CPC ....... *H04W 72/0493* (2013.01); *H04L 1/0003* (2013.01); *H04W 72/005* (2013.01);
(Continued)

(58) Field of Classification Search
CPC ............. H04W 72/04; H04W 72/0493; H04W 72/044; H04W 72/0446; H04W 72/0453;
(Continued)

(56) References Cited

U.S. PATENT DOCUMENTS

2017/0071010 A1  3/2017  Lim et al.
2018/0035406 A1*  2/2018  Hao ..................... H04L 5/0046
(Continued)

FOREIGN PATENT DOCUMENTS

CN  102045861 A  5/2011
CN  107548159 A  1/2018

OTHER PUBLICATIONS

CATT, CMCC, "Configuration of UL semi-persistent scheduling", 3GPP TSG RAN WG2 #62, Kansas City, United States of America, R2-082313, 6 pages, May 2008.
(Continued)

*Primary Examiner* — Warner Wong
(74) *Attorney, Agent, or Firm* — Perkins Coie LLP (57) ABSTRACT

Methods, systems, and devices related to the configuration of multiple transmissions to reduce signaling overhead between a wireless communication node and a user device. In one exemplary aspect, a method for wireless communication is described. The method includes receiving, at a mobile device, a first message from a wireless communication node, the first message including one or more parameters for configuring transmissions between the wireless communication node and the mobile device. The method includes performing, based on the one or more parameters included in the first message, a first transmission with the wireless communication node. The method also includes performing, based on at least one parameter of the one or more parameters included in the first message, a second transmission with the wireless communication node.

20 Claims, 4 Drawing Sheets

(51) Int. Cl.
*H04W 72/00* (2009.01)
*H04W 72/02* (2009.01)
*H04W 72/12* (2009.01)

(52) U.S. Cl.
CPC ....... *H04W 72/02* (2013.01); *H04W 72/0446* (2013.01); *H04W 72/0453* (2013.01); *H04W 72/1257* (2013.01)

(58) Field of Classification Search
CPC ... H04W 72/00; H04W 72/005; H04W 72/12; H04W 72/1205; H04W 72/1257; H04W 72/02; H04W 52/247; H04W 72/1263; H04W 72/1278; H04W 74/00; H04W 74/04; H04W 76/10; H04W 76/15; H04L 1/0001; H04L 1/0002; H04L 1/0003; H04L 1/0075; H04L 65/10; H04L 65/1069; H04L 29/06326
See application file for complete search history.

(56) References Cited

U.S. PATENT DOCUMENTS

| | | | | |
|---|---|---|---|---|
| 2018/0098349 | A1* | 4/2018 | Sun | H04W 72/14 |
| 2018/0199359 | A1* | 7/2018 | Cao | H04L 5/0051 |
| 2018/0199381 | A1* | 7/2018 | Rong | H04W 74/08 |
| 2018/0206246 | A1* | 7/2018 | Zhang | H04L 1/1896 |
| 2018/0288746 | A1* | 10/2018 | Zhang | H04L 1/0031 |
| 2018/0368136 | A1* | 12/2018 | Lien | H04W 72/0413 |
| 2019/0103942 | A1* | 4/2019 | Wu | H04L 5/0048 |
| 2019/0104539 | A1* | 4/2019 | Park | H04W 72/1289 |
| 2019/0319762 | A1* | 10/2019 | Zhang | H04L 5/0048 |
| 2019/0327020 | A1* | 10/2019 | Gao | H04L 1/0013 |
| 2019/0349932 | A1* | 11/2019 | Yu | H04W 72/0453 |
| 2020/0127778 | A1* | 4/2020 | Zhuang | H04W 28/0278 |
| 2020/0128537 | A1* | 4/2020 | Zou | H04L 1/1864 |
| 2020/0204408 | A1* | 6/2020 | Chai | H04L 25/0226 |
| 2020/0252155 | A1* | 8/2020 | Kim | H04L 1/0004 |
| 2020/0252955 | A1* | 8/2020 | Takeda | H04W 72/1284 |
| 2020/0288490 | A1* | 9/2020 | Lin | H04W 72/0413 |
| 2020/0344804 | A1* | 10/2020 | Xu | H04W 74/0808 |
| 2020/0404666 | A1* | 12/2020 | Gao | H04W 72/0413 |
| 2021/0068086 | A1* | 3/2021 | Behravan | H04W 72/042 |
| 2021/0289539 | A1* | 9/2021 | Byun | H04L 1/0003 |

OTHER PUBLICATIONS

International Search Report and Written Opinion dated Oct. 24, 2018 for International Application No. PCT/CN2018/073611, filed on Jan. 22, 2018 (8 pages).

* cited by examiner

CONFIGURING MULTIPLE TRANSMISSIONS

CROSS REFERENCE TO RELATED APPLICATIONS

This patent document is a continuation of and claims benefit of priority to International Patent Application No. PCT/CN2018/073611, filed on Jan. 22, 2018. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY OF PARTICULAR EMBODIMENTS

This document discloses methods, systems, and devices related to digital wireless communications, and more specifically, to techniques related to the configuration of multiple transmissions to reduce signaling overhead between a wireless network via a wireless communication node on the wireless network side (e.g., a base station) and a user mobile device or user equipment (UE).

In one exemplary aspect, the disclosed technology can be implemented as a method for wireless communication. The method includes receiving, at a mobile device, a first message from a wireless communication node, the first message including one or more parameters for configuring transmissions between the wireless communication node and the mobile device; performing, based on the one or more parameters included in the first message, a first transmission with the wireless communication node; and performing, based on at least one parameter of the one or more parameters included in the first message, a second transmission with the wireless communication node.

In some embodiments, performing the second transmission is further based on one or more parameters included in a second message from the wireless communication node. In some implementations, the second message is broadcasted or multi-casted by the wireless communication node.

In some embodiments, the one or more parameters in the first message indicate at least one of the following: a time-frequency resource for the first transmission, a time-frequency resource pool for the first transmission, a signal signature specific to the wireless device for the first transmission, a signal signature pool specific to the wireless device for the first transmission, a modulation and coding scheme for the first transmission, a modulation and coding scheme pool for the first transmission, a code rate of the first transmission, a spreading factor of the first transmission, a power of the first transmission, an expected received power for the first transmission, or a power range for the first transmission. In some implementations, the one or more parameters in the first message include information for a semi-persistent scheduling of the first transmission.

In some embodiments, the at least one parameter of the one or more parameters in the first message indicates at least one of the following: a time-frequency resource for the second transmission, a time-frequency resource pool for the second transmission, a signal signature specific to the wireless device for the second transmission, a signal signature pool specific to the wireless device for the second transmission, a modulation and coding scheme for the second transmission, a modulation and coding scheme pool for the second transmission, a power of the second transmission, an expected received power for the second transmission, or a power range for the second transmission. In some implementations, the second transmission includes a semi-persistent re-transmission. In some implementations, the second transmission includes a grant-free transmission. In some embodiments, the first message includes a radio resource control message.

In another exemplary aspect, the disclosed technology can be implemented to provide a method for wireless communication. The method includes transmitting, from a wireless communication node to a mobile device, a first message including one or more parameters for configuring transmissions between the wireless communication node and the mobile device, wherein the one or more parameters indicate information for a first transmission between the wireless communication node and the mobile device, and at least one parameter of the one or more parameters indicates information for a second transmission between the wireless communication node and the mobile device.

In some embodiments, the method includes transmitting, from the wireless communication node, a second message including one or more parameters indicating information for the second transmission between the wireless communication node and the mobile device. In some implementations, the transmitting of the second message is performed by broadcasting or multi-casting.

In some embodiments, the one or more parameters in the first message indicate at least one of the following: a time-frequency resource for the first transmission, a time-frequency resource pool for the first transmission, a signal signature specific to the wireless device for the first transmission, a signal signature pool specific to the wireless device for the first transmission, a modulation and coding scheme for the first transmission, a modulation and coding scheme pool for the first transmission, a code rate of the first transmission, a spreading factor of the first transmission, a power of the first transmission, an expected received power for the first transmission, or a power range for the first transmission. In some implementations, the one or more parameters in the first message include information for a semi-persistent scheduling of the first transmission.

In some embodiments, the at least one parameter of the one or more parameters in the first message indicates at least one of the following: a time-frequency resource for the second transmission, a time-frequency resource pool for the second transmission, a signal signature specific to the wireless device for the second transmission, a signal signature pool specific to the wireless device for the second transmission, a modulation and coding scheme for the second transmission, a modulation and coding scheme pool for the second transmission, a power of the second transmission, an expected received power for the second transmission, or a power range for the second transmission. In some implementations, the second transmission includes a semi-persistent re-transmission. In some implementations, the second transmission includes a grant-free transmission. In some embodiments, the message includes a radio resource control message.

In another exemplary aspect, the disclosed technology can be implemented to provide a wireless communications apparatus comprising a processor. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

With the continuous development of wireless communication technologies, a wide range of wireless communication services are emerging, which will greatly increase the demand for bandwidth in wireless communication systems. The development of the new generation of wireless communication—5G New Radio (NR) communication—is a part of an ongoing mobile broadband evolution process to meet the requirements of increasing network demand. NR will provide, among other features, greater throughput to allow more users to connect at the same time. Aspects such as energy consumption, device cost, spectral efficiency, and latency are important to meeting the needs of various communication scenarios.

Wireless communication services that have various latency and throughput requirements, such as Ultra Reliance Low Latency Connection (URLLC) and massive machine type connection (mMTC), may pose great challenges to wireless systems. In order to support services like mMTC while satisfying low latency requirements, techniques such as non-orthogonal multiple access (NOMA) transmissions have been introduced. These techniques can be essential in enabling NR wireless systems to meet the demands for reduced latency, high reliability, massive connectivity, improved fairness, and/or high throughput.

Figure 1:
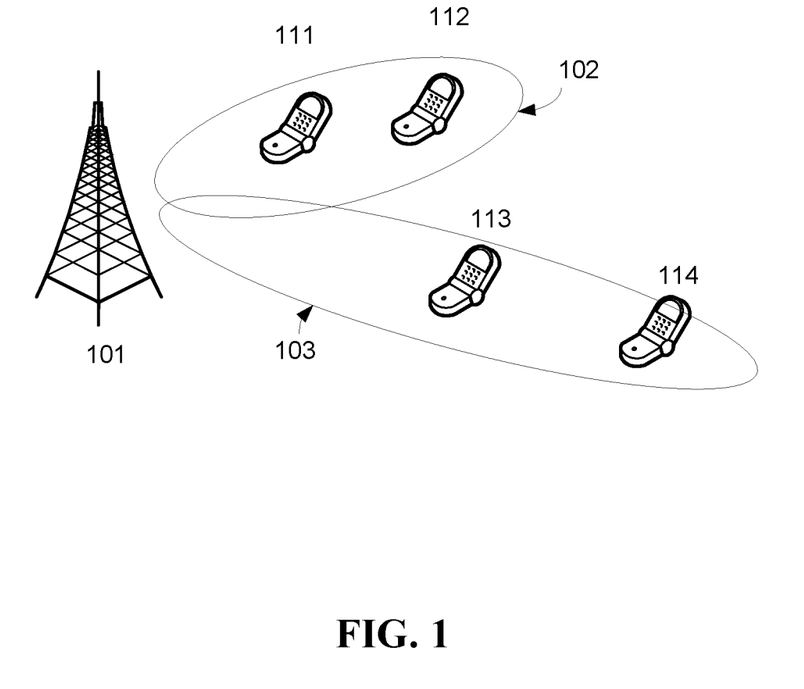
FIG. 1 shows a schematic diagram of an exemplary wireless communication system supporting multiple-input multiple-out (MIMO) non-orthogonal multiple access (NOMA).

FIG. 1 is an schematic diagram of an exemplary wireless communication system supporting multiple-input multiple-out (MIMO) NOMA. As shown in FIG. 1, UEs that have strongly correlated channels are paired together to share the same beam and perform NOMA. For example, UE 111 and UE 112 are paired together to share beam 102 for NOMA transmissions with a base station 101; UE 113 and UE 114 are paired together to share beam 103 for NOMA transmissions with the base station 101. There are at least two main categories of NOMA transmission: transmissions based on pre-configurations of time-frequency resources (e.g., semi-persistent scheduling of transmissions), and transmissions that exempt authorization (also known as grant-free transmissions or contention-based transmissions). Using NOMA techniques, signaling overhead and latency may be reduced, allowing a wireless communication node on the wireless network side (e.g., a base station) to support more user equipment (UE) simultaneously.

Current NOMA techniques, however, still have some limitations. For example, a UE can only use one data rate and/or modulation coding scheme (MCS) to perform a set of grant free transmissions. Transmitting using a different data rate or a different MCS requires additional signaling and reconfigurations from a wireless communication node such as a serving base station. This patent document describes techniques to allow UEs to perform NOMA transmissions using various configurations (e.g., different MCS or data rates) without impacting signaling overhead. In some embodiments, the wireless communication node (e.g., the base station) can include information for configuration multiple transmissions in a single message. For example, the wireless communication node can send a message to a UE to configure a first transmission. The message also includes information that can be used by the UE to derive or infer configuration parameters for a second transmission. Because the wireless communication node is not required to transmit the derived parameters via signaling, signaling overhead between the wireless communication node and the UE thus is reduced.

Figure 2:
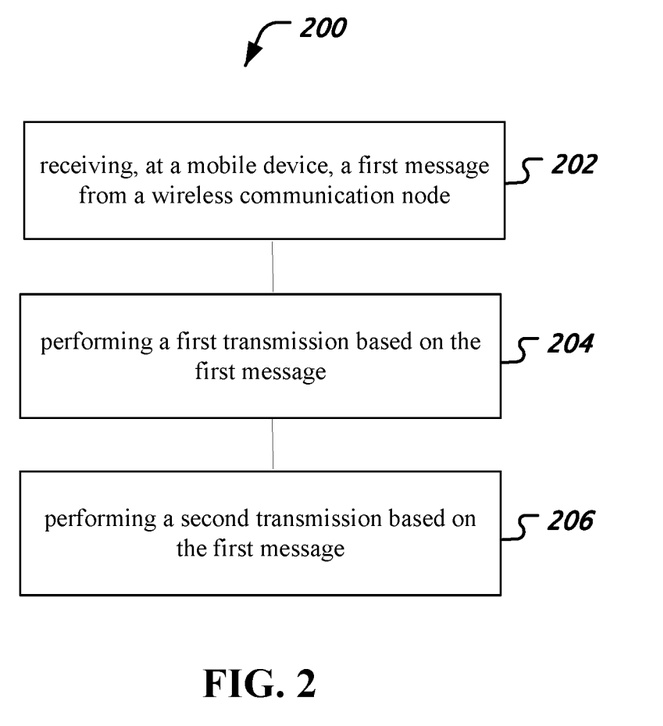
FIG. 2 is a flowchart representation of a method for wireless communication.

FIG. 2 is a flowchart representation of a method 200 for wireless communication. The method 200 includes, at 202, receiving, at a mobile device, a first message from a wireless communication node, the first message including one or more parameters for configuring transmissions between the wireless communication node and the mobile device. The method includes, at 204, performing, based on the one or more parameters included in the first message, a first transmission with the wireless communication node. The method also includes, at 206, performing, based on at least one parameter of the one or more parameters included in the first message, a second transmission with the wireless communication node.

Figure 3:
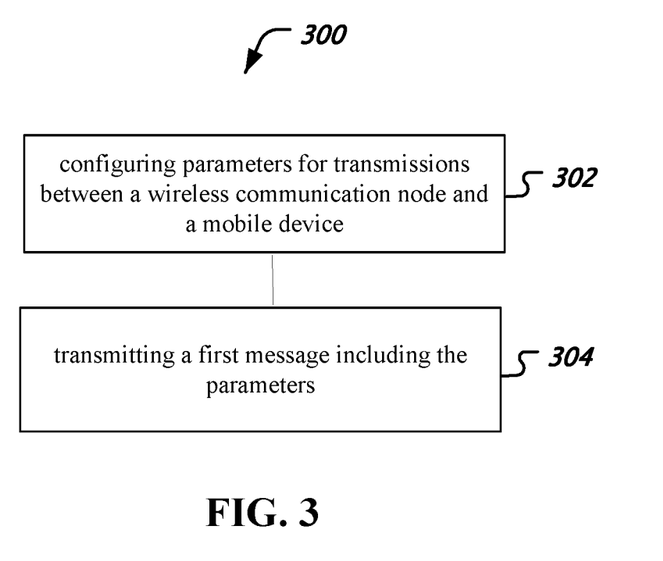
FIG. 3 is a flowchart representation of another method for wireless communication.

FIG. 3 is a flowchart representation of a method 300 for wireless communication. The method 300 includes, at 302, configuring one or more parameters for transmissions between a wireless communication node and a mobile device. The method also includes, at 304, transmitting, from the wireless communication node to the mobile device, a first message including the one or more parameters.

Details of the disclosed techniques are further described in the following embodiments.

Example Embodiment 1

In this embodiment of a wireless communication system which includes a wireless communication node and at least one UE, the wireless communication node determines configuration parameters for transmissions between the wireless communication node and the UE. For example, the wireless communication node determines parameters for configuring downlink (DL) transmissions from the wireless communication node to the UE. The wireless communication node can also determine parameters for uplink (UL) transmissions, including semi-persistent scheduling (SPS) transmissions and/or grant-free transmissions, from the UE to the wireless communication node.

In some implementations, the wireless communication node sends a first message to the UE to configure a first transmission. The first message can be a radio resource control (RRC) message. In some embodiments, the first message includes information about a semi-persistent scheduling (SPS) of the first transmission. At the same time, the first message also includes at least one parameter indicating information for a second transmission (e.g., a grant-free transmission).

In some implementations, the first message includes a parameter indicating time-frequency resource(s) for the first transmission. Alternatively, the parameter can indicate a time-frequency resource pool for the first transmission. The parameter indicating time-frequency resource(s) for the first transmission also indicates the time-frequency resource(s) or time-frequency resource pool that the UE can use for the second transmission. For example, the subframe of time-frequency resource configured for the first transmission is denoted as $R_1$. After obtaining the value of R1 included in the first message, the UE can derive a mapping between R1 and the subframe of time-frequency resource configured for the second transmission, denoted as R2. In some embodiments, R1 is the same as R2. In some implementations, there exists a pre-defined offset between R1 and R2. In another example, R1 is calculated as $R_1=n_{subframe}+n_{PRB} \cdot 10$, and $R_2$ can be determined by $R_2=mod(R_1,M)$, wherein M is a predefined value or a value obtained from previous signaling.

In some implementations, the first message includes a parameter indicating a UE-specific signal signature for the first transmission. Alternatively, the parameter can indicate a UE-specific signal signature pool for the UE to select from for the first transmission. The parameter also indicate a UE-specific signal signature (or a UE-specific signal signature pool) for the second transmission. For example, the UE-specific signature index (or the signature index pool) for the first transmission is denoted as S1. After obtaining the value(s) for S1 included the first message, the UE can derive a mapping between S1 and the signature index or the signature index pool S2 for the second transmission. The mapping can be a one-to-one mapping when S2 indicates a signature index for the second transmission. The mapping can also be one-to-many, or many-to-many. For example, in some implementations, $S_2=S_1+\Delta_S$. The offset of signature index $\Delta_S$ is a value that is predefined or indicated by previous signaling. In another example, a one-to-many mapping exists between S1 and S1: $S_2=f(S_1)$, in which f(s) is a predefined mapping function. In some embodiments, the UE-specific signature index $S_1$ for the first transmission is in a range from 0 to M−1 while the UE-specific signature index S2 for the second transmission is in a range from 0 to N−1. The mapping between S1 and S2 can be predefined as: $S_2=N/M \cdot S_1+\{0,1, \ldots, N/M-1\}$. Other similar functions can also be used for the mapping. The UE can first perform the first transmission based on the one or more parameters in the first message. The UE can then perform the second transmission based on the at least one parameter in the first message.

In some embodiments, the wireless communication node can also transmit a second message (e.g., via broadcasting or multi-casting) to inform the UE of additional information for the second transmission (e.g., a grant-free transmission). The UE can perform the second transmission based on the at least one parameter in the first message and additional information in the second message.

Example Embodiment 2

In this embodiment of a wireless communication system which includes a wireless communication node and at least one UE, the wireless communication node determines configuration parameters for transmissions between the wireless communication node and the UE. For example, the wireless communication node determines parameters for configuring downlink (DL) transmissions from the wireless communication node to the UE. The wireless communication node can also determine parameters for uplink (UL) transmissions, including SPS transmissions and/or grant-free transmissions, from the UE to the wireless communication node. In this example, the UE may be in different RRC states. The UE receives configuration information and performs NOMA transmissions based on different configurations for different RRC states.

In some embodiments, the wireless communication node sends a first message to the UE to configure a first transmission, e.g., a semi-persistent scheduling (SPS) transmission, when the UE is in RRC_active or RRC_inactive state. The first message also includes at least one parameter that indicates information for a second transmission, e.g., a grant-free transmission, when the UE is in RRC_inactive or RRC_idle state. The UE can first perform the first transmission when it is in RRC_active or RRC_inactive state based on the one or more parameters in the first message. The UE can later perform the second transmission when it is in RRC_inactive or RRC_idle state based on the at least one parameter in the first message.

In some embodiments, the wireless communication node can also transmit a second message (e.g., via broadcasting or multi-casting) to inform the UE of additional information for the second transmission (e.g., a grant-free transmission). The UE can perform the second transmission when it is in RRC_inactive or RRC_idle state based on the at least one parameter in the first message and additional information in the second message.

Example Embodiment 3

In this embodiment of a wireless communication system which includes a wireless communication node and at least one UE, the wireless communication node determines configuration parameters for transmissions between the wireless communication node and the UE. For example, the wireless communication node determines parameters for configuring downlink (DL) transmissions from the wireless communication node to the UE. The wireless communication node can also determine parameters for uplink (UL) transmissions, including SPS transmissions and/or grant-free transmissions, from the UE to the wireless communication node.

In some implementations, the wireless communication node sends a first message to the UE to configure a first transmission. The first message can be a radio resource control (RRC) message. In some embodiments, the first message includes information about a semi-persistent (SPS) scheduling of the first transmission. At the same time, the first message also includes at least one parameter indicating information for a second transmission (e.g., a grant-free transmission).

In some implementations, the first message includes a parameter indicating the spectrum efficiency of the first transmission. The spectrum efficiency can be reflected in at least one of the following: the MCS, the coding rate, the modulation order, and/or the spreading factor.

In some implementations, the first message includes a parameter indicating a MCS for the first transmission. Alternatively, the parameter can indicate a MCS pool for the first transmission. The parameter indicating the MCS for the first transmission also indicates a MCS or a MCS pool for the second transmission. For example, the MCS index for the first transmission is denoted as $MCS_1$. After obtaining the value of $MCS_1$ in the first message, the UE can derived a mapping between $MCS_1$ and the MCS or MCS pool $MCS_2$ for the second transmission. For example, the mapping between $MCS_1$ and $MCS_2$ can be $MCS_2 = MCS_1 + \Delta_{MCS}$. The offset of MCS $\Delta_{MCS}$ can be a value or a value set that is predefined or indicated by previous signaling.

In some implementations, the first message includes a parameter indicating a code rate for the first transmission. The parameter indicating the code rate for the first transmission also indicates a code rate for the second transmission. For example, the code rate for the first transmission is denoted as $Rcode_1$. After obtaining the value of $Rcode_1$ in the first message, the UE can derive a mapping between $Rcode_1$ and the code rate for the second transmission denoted as $Rcode_2$. For example, the mapping between $Rcode_1$ and $Rcode_2$ can be: $Rcode_2 = Rcode_1 + \Delta_{R_{code}}$. The offset of the code rate $\Delta_{R_{code}}$ can be predefined or indicated by previous signaling. The UE can first perform the first transmission based on the one or more parameters in the first message. The UE can then perform the second transmission based on the at least one parameter in the first message.

In some embodiments, the wireless communication node can also transmit a second message (e.g., via broadcasting or multi-casting) to inform the UE of additional information for the second transmission (e.g., a grant-free transmission). The UE can perform the second transmission based on the at least one parameter in the first message and additional information in the second message.

Example Embodiment 4

In this embodiment of a wireless communication system which includes a wireless communication node and at least one UE, the wireless communication node determines configuration parameters for transmissions between the wireless communication node and the UE. For example, the wireless communication node determines parameters for configuring downlink (DL) transmissions from the wireless communication node to the UE. The wireless communication node can also determine parameters for uplink (UL) transmissions, including SPS transmissions, from the UE to the wireless communication node.

In some implementations, the wireless communication node sends a first message to the UE to configure a first transmission. The first message can be a radio resource control (RRC) message. In some embodiments, the first message includes information about a semi-persistent (SPS) scheduling of the first transmission (e.g., an initial SPS transmission). At the same time, the first message also includes at least one parameter indicating information for a second transmission (e.g., an SPS re-transmission).

In some implementations, the first message includes a parameter indicating the spectrum efficiency of the first transmission. The spectrum efficiency can be reflected in at least one of the following: the MCS, the coding rate, the modulation order, and/or the spreading factor. Examples of parameters for spectrum efficiency are described in the Example Embodiment 3. The UE can first perform the first transmission based on the one or more parameters in the first message. The UE can later perform the second transmission based on the at least one parameter in the first message.

In some embodiments, the wireless communication node can also transmit a second message (e.g., via broadcasting or multi-casting) to inform the UE of additional information for the second transmission (e.g., the SPS re-transmission). The UE then can perform the second transmission based on the at least one parameter in the first message and additional information in the second message.

Example Embodiment 5

In this embodiment of a wireless communication system which includes a wireless communication node and at least one UE, the wireless communication node determines configuration parameters for transmissions between the wireless communication node and the UE. For example, the wireless communication node determines parameters for configuring downlink (DL) transmissions from the wireless communication node to the UE. The wireless communication node can also determine parameters for uplink (UL) transmissions, including SPS transmissions and/or grant-free transmissions, from the UE to the wireless communication node.

In some implementations, the wireless communication node sends a first message to the UE to configure a first transmission. The first message can be a radio resource control (RRC) message. In some embodiments, the first message includes information about a semi-persistent (SPS) scheduling of the first transmission (e.g., an initial SPS transmission). At the same time, the first message also includes at least one parameter indicating information for a second transmission (e.g., a grant-free transmission or an SPS re-transmission). The UE may selectively perform the first transmission or the second transmission depending on the channel conditions it senses.

In some implementations, the first message includes a parameter indicating a power, an expected received power, or a power range for the first transmission. The parameter also indicates a power, an expected received power, and/or a power range for the second transmission. For example, the expected received power for the first transmission is $P_1$. After obtaining the value of $P_1$ in the first message, the UE can derive a mapping between $P_1$ and the expected received power for the second transmission denoted as $P_2$. The mapping between $P_1$ and $P_2$ can be $P_2 = P_1 + \Delta_P$. The offset of power $\Delta_P$ can be predefined or indicated by previous signaling.

In some implementations, the first message includes a parameter indicating a MCS for the first transmission. Alternatively, the parameter can indicate a MCS pool for the first transmission. The parameter indicating the MCS for the first transmission also indicates a MCS or a MCS pool for the second transmission. For example, the MCS for the first transmission is denoted as $MCS_1$. After obtaining a parameter indicating $MCS_1$ in the first message, the UE can derived a mapping between $MCS_1$ and the MCS or MCS pool $MCS_2$ for the second transmission. For example, the mapping between $MCS_1$ and $MCS_2$ can be $MCS_2 = MCS_1 + \Delta_{MCS}$. The offset of MCS $\Delta_{MCS}$ is a value or a value set that is predefined or indicated by previous signaling.

The UE may choose to perform the first transmission or the second transmission based on its channel environment. For example, when the UE experiences a path loss higher than a given threshold, or a signal to interference and noise ratio (SINR) lower than another given threshold, the UE can perform the first transmission based on parameters included in the first message. Alternatively, when the UE experiences a path loss lower than a given threshold, or an SINR higher than another given threshold, the UE can perform the second transmission based on the at least the one parameter in the first message.

In some embodiments, the wireless communication node can also transmit a second message (e.g., via broadcasting or multi-casting) to inform the UE of additional information for the second transmission. Depending on the channel environment, the UE can choose to perform the second transmission based on the at least one parameter in the first message and additional information in the second message.

Figure 4:
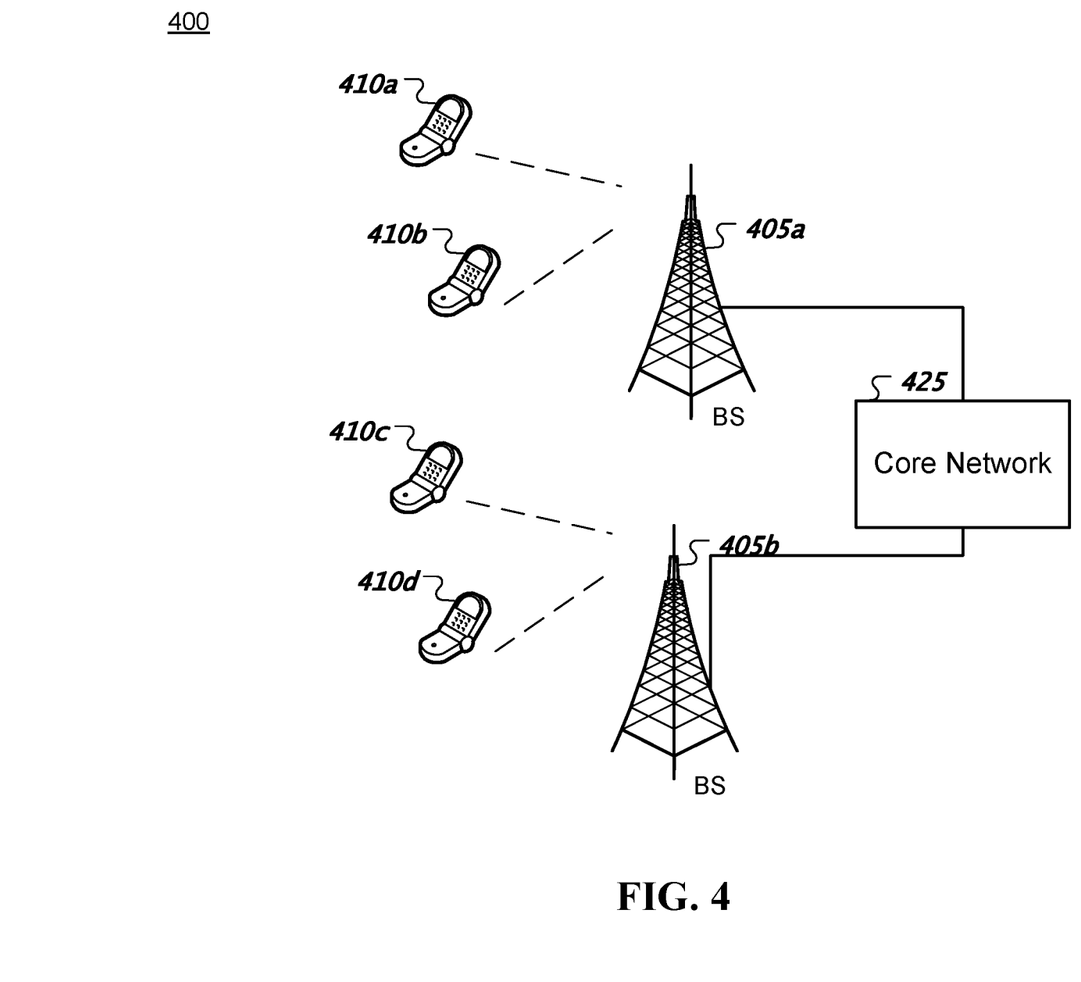
FIG. 4 shows an example of a wireless communication system where techniques in accordance with one or more embodiments of the disclosed technology can be applied.

FIG. 4 shows an example of a wireless communication system where techniques in accordance with one or more embodiments of the disclosed technology can be applied. A wireless communication system 800 can include one or more base stations (BSs) 405*a*, 405*b*, one or more wireless devices 410*a*, 410*b*, 410*c*, 410*d*, and a core network 425. A base station 405*a*, 405*b* can provide wireless service to wireless devices 410*a*, 410*b*, 410*c* and 410*d* in one or more wireless sectors. In some implementations, a base station 405*a*, 405*b* includes directional antennas to produce two or more directional beams to provide wireless coverage in different sectors.

The core network 425 can communicate with one or more base stations 405*a*, 405*b*. The core network 425 provides connectivity with other wireless communication systems and wired communication systems. The core network may include one or more service subscription databases to store information related to the subscribed wireless devices 410*a*, 410*b*, 410*c*, and 410*d*. A first base station 405*a* can provide wireless service based on a first radio access technology, whereas a second base station 405*b* can provide wireless service based on a second radio access technology. The base stations 405*a* and 405*b* may be co-located or may be separately installed in the field according to the deployment scenario. The wireless devices 410*a*, 410*b*, 410*c*, and 410*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
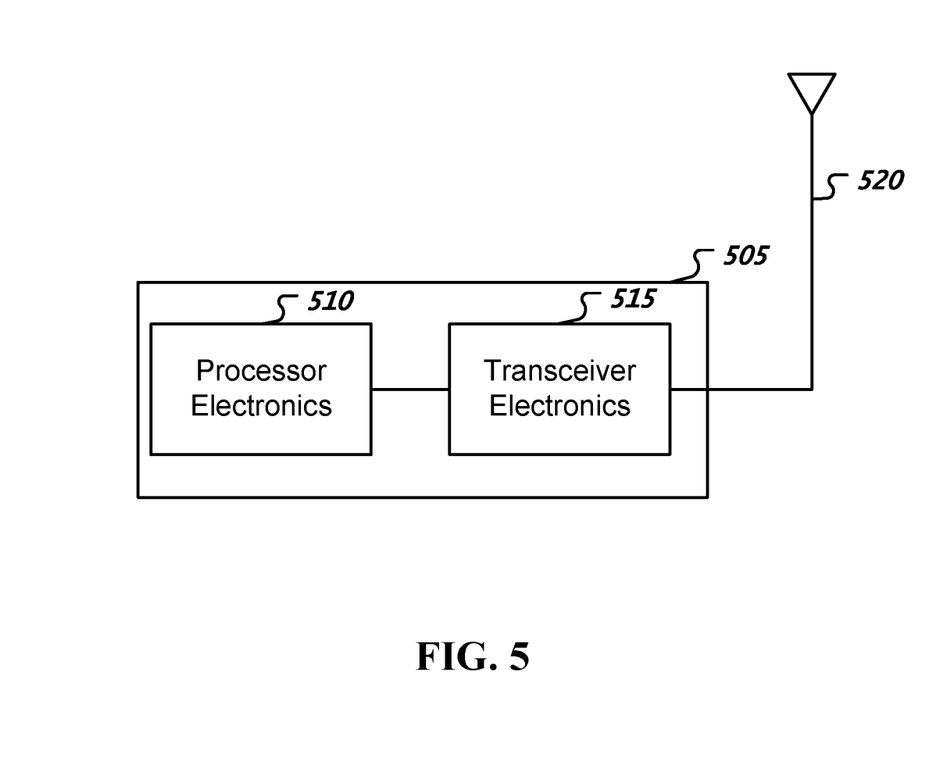
FIG. 5 is a block diagram representation of a portion of a radio station.

FIG. 5 is a block diagram representation of a portion of a radio station. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 920. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

It is thus evident that methods and corresponding apparatus relating to the configuration of multiple transmission to reduce signaling overhead between a wireless communication node and a user device are disclosed. Using the disclosed techniques, a wireless communication node can include configuration parameters that can be used for multiple transmissions in a single message, thereby reducing signaling overhead between the wireless communication node and the UE. For example, he UE can use the parameters directly for a first transmission, and derive or infer parameters for a second transmission based on the message. The UE can also selectively determine if it should perform the first transmission or the second transmission based on channel conditions.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
receiving, at a wireless device, a first message from a wireless communication node, the first message including one or more parameters for configuring transmissions between the wireless communication node and the wireless device, wherein the one or more parameters indicate a first time-frequency resource for a semi-persistent scheduling (SPS) transmission;
deriving, by the wireless device, a second time-frequency resource for a grant-free transmission based on a predefined mapping between the first time-frequency resource and the second time-frequency resource;
performing, by the wireless device based on the one or more parameters included in the first message, the SPS transmission with the wireless communication node using the first time-frequency resource; and
performing, by the wireless device based on the one or more parameters included in the first message, the grant-free transmission with the wireless communication node using the second time-frequency resource.

2. The method of claim 1, wherein performing the grant-free transmission is further based on one or more parameters included in a second message that is broadcasted or multi-casted from the wireless communication node.

3. The method of claim 1, wherein the one or more parameters in the first message indicate at least one of: a signal signature specific to the wireless device for the SPS transmission, a signal signature pool specific to the wireless device for the SPS transmission, a modulation and coding scheme for the SPS transmission, a modulation and coding scheme pool for SPS transmission, a code rate of the SPS transmission, a spreading factor of the SPS transmission, a power of the SPS transmission, an expected received power for the SPS transmission, or a power range for the SPS transmission.

4. The method of claim 1, wherein at least one parameter of the one or more parameters in the first message indicates at least one of: a signal signature specific to the wireless device for the grant-free transmission, a signal signature pool specific to the wireless device for the grant-free transmission, a modulation and coding scheme for the grant-free transmission, a modulation and coding scheme pool for the grant-free transmission, a power of the grant-free transmission, an expected received power for the grant-free transmission, or a power range for the grant-free transmission.

5. A method for wireless communication, comprising:
transmitting, from a wireless communication node to a wireless device, a first message including one or more parameters for configuring transmissions between the wireless communication node and the wireless device, wherein the one or more parameters indicate a first time-frequency resource for a semi-persistent scheduling (SPS) transmission between the wireless communication node and the wireless device, and wherein the one or more parameters enable the wireless device to derive a second time-frequency resource for a grant-free transmission between the wireless communication node and the wireless device based on a predefined mapping between the first time-frequency resource and the second time-frequency resource.

6. The method of claim 5, comprising:
broadcasting or multi-casting, from the wireless communication node, a second message including one or more parameters indicating information for the grant-free transmission between the wireless communication node and the wireless device.

7. The method of claim 5, wherein the one or more parameters in the first message indicate at least one of: a signal signature specific to the wireless device for the SPS transmission, a signal signature pool specific to the wireless device for the SPS transmission, a modulation and coding scheme for the SPS transmission, a modulation and coding scheme pool for the SPS transmission, a code rate of the SPS transmission, a spreading factor of the SPS transmission, a power of the SPS transmission, an expected received power for the SPS transmission, or a power range for the SPS transmission.

8. The method of claim 5, wherein at least one parameter of the one or more parameters in the first message indicates at least one of: a signal signature specific to the wireless device for the grant-free transmission, a signal signature pool specific to the wireless device for the grant-free transmission, a modulation and coding scheme for the grant-free transmission, a modulation and coding scheme pool for the grant-free transmission, a power of the grant-free transmission, an expected received power for the grant-free transmission, or a power range for the grant-free transmission.

9. An apparatus for wireless communication comprising:
a processor; and
a memory including processor executable code, wherein the processor executable code upon execution by the processor configures the processor to:
receive a first message from a wireless communication node, the first message including one or more parameters for configuring transmissions between the wireless communication node and the apparatus, wherein the one or more parameters indicate a first time-frequency resource for a semi-persistent scheduling (SPS) transmission;
derive a second time-frequency resource for a grant-free transmission based on a predefined mapping between the first time-frequency resource and the second time-frequency resource;
perform, based on the one or more parameters included in the first message, the SPS transmission with the wireless communication node using the first time-frequency resource; and
perform, based on the one or more parameters included in the first message, the grant-free transmission with the wireless communication node using the second time-frequency resource.

10. The apparatus of claim 9, wherein the processor is configured to perform the grant-free transmission based on one or more parameters included in a second message that is broadcasted or multi-casted from the wireless communication node.

11. The apparatus of claim 9, wherein the one or more parameters in the first message indicate at least one of: a signal signature specific to the apparatus for the SPS transmission, a signal signature pool specific to the apparatus for the SPS transmission, a modulation and coding scheme for the SPS transmission, a modulation and coding scheme pool for the SPS transmission, a code rate of the SPS transmission, a spreading factor of the SPS transmission, a power of the SPS transmission, an expected received power for the SPS transmission, or a power range for the SPS transmission.

12. The apparatus of claim 9, wherein at least one parameter of the one or more parameters in the first message indicates at least one of: a signal signature specific to the apparatus for the grant-free transmission, a signal signature pool specific to the apparatus for the grant-free transmission, a modulation and coding scheme for the grant-free transmission, a modulation and coding scheme pool for the grant-free transmission, a power of the grant-free transmission, an expected received power for the grant-free transmission, or a power range for the grant-free transmission.

13. An apparatus for wireless communication comprising:
a processor; and
a memory including processor executable code, wherein the processor executable code upon execution by the processor configures the processor to:
transmit, to a wireless device, a first message including one or more parameters for configuring transmissions between the apparatus and the wireless device,
wherein the one or more parameters indicate a first time-frequency resource for a semi-persistent scheduling (SPS) transmission between the apparatus and the wireless device, and wherein the one or more parameters enable the wireless device to derive a second time-frequency resource for a grant-free transmission between the apparatus and the wireless device based on a predefined mapping between the first time-frequency resource and the second time-frequency resource.

14. The apparatus of claim 13, wherein the processor is configured to broadcast or multi-cast a second message including one or more parameters indicating information for the grant-free transmission between the apparatus and the wireless device.

15. The apparatus of claim 13, wherein the one or more parameters in the first message indicate at least one of: a signal signature specific to the wireless device for the SPS transmission, a signal signature pool specific to the wireless device for the SPS transmission, a modulation and coding scheme for the SPS transmission, a modulation and coding scheme pool for the SPS transmission, a code rate of the SPS transmission, a spreading factor of the SPS transmission, a power of the SPS transmission, an expected received power for the SPS transmission, or a power range for the SPS transmission.

16. The apparatus of claim 13, wherein at least one parameter of the one or more parameters in the first message indicates at least one of: a signal signature specific to the wireless device for the grant-free transmission, a signal signature pool specific to the wireless device for the grant-free transmission, a modulation and coding scheme for the grant-free transmission, a modulation and coding scheme pool for the grant-free transmission, a power of the grant-free transmission, an expected received power for the grant-free transmission, or a power range for the grant-free transmission.

17. The method of claim 1, wherein the predefined mapping comprises at least one of: a first mapping indicating that the first time-frequency resource is same as the second time-frequency resource, a second mapping indicating a predefined offset between the first time-frequency resource and the second time-frequency resource, or a third mapping indicating a modulo operation associating the first time-frequency resource with the second time-frequency resource.

18. The method of claim 5, wherein the predefined mapping comprises at least one of: a first mapping indicating that the first time-frequency resource is same as the second time-frequency resource, a second mapping indicating a predefined offset between the first time-frequency resource and the second time-frequency resource, or a third mapping indicating a modulo operation associating the first time-frequency resource with the second time-frequency resource.

19. The apparatus of claim 9, wherein the predefined mapping comprises at least one of: a first mapping indicating that the first time-frequency resource is same as the second time-frequency resource, a second mapping indicating a predefined offset between the first time-frequency resource and the second time-frequency resource, or a third mapping indicating a modulo operation associating the first time-frequency resource with the second time-frequency resource.

20. The apparatus of claim 13, wherein the predefined mapping comprises at least one of: a first mapping indicating that the first time-frequency resource is same as the second time-frequency resource, a second mapping indicating a predefined offset between the first time-frequency resource and the second time-frequency resource, or a third mapping indicating a modulo operation associating the first time-frequency resource with the second time-frequency resource.

* * * * *